United States Patent [19]

Faroudja et al.

[11] Patent Number: 4,731,660
[45] Date of Patent: Mar. 15, 1988

[54] PROCESSING METHODS USING ADAPTIVE THRESHOLD FOR REMOVAL OF CHROMA/LUMINANCE CROSS-TALK IN QUADRATURE-MODULATED SUBCARRIER COLOR TELEVISION SYSTEMS

[75] Inventors: Yves C. Faroudja, 26595 Anacapa Dr., Los Altos Hills, Calif. 94022; Jack J. Campbell, San Francisco, Calif.

[73] Assignee: Yves C. Faroudja, Los Altos Hills, Calif. ; a part interest

[21] Appl. No.: 17,166

[22] Filed: Feb. 20, 1987

[51] Int. Cl.$^4$ .................. H04N 11/14; H04N 9/78
[52] U.S. Cl. ............................. 358/31; 358/16; 358/36
[58] Field of Search ............. 358/31, 36, 37, 38, 358/16

[56] References Cited

U.S. PATENT DOCUMENTS

| | | | |
|---|---|---|---|
| 4,345,268 | 8/1982 | Clarke | 358/31 |
| 4,638,351 | 1/1987 | Clarke | 358/31 |
| 4,656,502 | 4/1987 | Hausdorfer | 358/31 |

FOREIGN PATENT DOCUMENTS

| | | | |
|---|---|---|---|
| 42483 | 4/1981 | Japan | 358/31 |
| 806391 | 12/1958 | United Kingdom | 358/31 |
| 2072991 | 10/1981 | United Kingdom | 358/31 |

*Primary Examiner*—John W. Shepperd
*Attorney, Agent, or Firm*—David B. Harrison

[57] ABSTRACT

A comb filter for improved cross-color reduction with improved visible diagonal resolution is provided for processing a luminance component of a quadrature modulated color subcarrier television signal in the vicinity of the color subcarrier pass band. The comb filter comprises an input and an output, and has a first path including a delay circuit for delaying the luminance component and a subtraction circuit connected between the input and the output, and has a second path including a chrominance type comb filter, a band pass filter for passing a spectrum in the vicinity of the color subcarrier pass band both being followed by a variable threshold circuit connected to the subtraction circuit. The variable threshold circuit is for inhibiting the signal in the second path below a variable threshold. The variable threshold is derived as a function of at least one of luminance diagonal transition level, chroma level and averaged luminance activity in the spectrum in the vicinity of the color subcarrier.

8 Claims, 15 Drawing Figures

THRESHOLD IMPLEMENTATION

FIG. 1 (PRIOR ART)
TYPICAL QUADRATURE MODULATED
COLOR TELEVISION SPECTRUM (NTSC)

FIG. 2 (PRIOR ART)
TYPICAL NTSC ENCODER

FIG. 3 (PRIOR ART)

CHROMA/LUMINANCE SPECTRUM IN
THE VICINITY OF THE SUBCARRIER

FIG. 4

IMPROVED ENCODER
(PRIOR ART)

DIFFERENT COMB FILTER AND Y/C SPECTRAL
OVERLAP CONFIGURATIONS IN ENCODER

FIG. 6
ALTERNATIVE APPROACH TO LUMINANCE COMBING

FIG. 7
AN EXAMPLE OF DETAIL IMPLEMENTATION
OF FIGURE 6 CONFIGURATION

FIG. 8
THRESHOLD IMPLEMENTATION

FIG. 9
THRESHOLD OUTPUT

FIG. 10

THRESHOLD OPTIMIZATION
IN FUNCTION OF CHROMA LEVEL

FIG. 11

PRACTICAL IMPLEMENTATION
OF VARIABLE THRESHOLD

FIG. 12

THRESHOLD CONTROL BY CHROMA LEVEL AND AVERAGE CROSS-COLOR ACTIVITY IN Y PATH

PROCESSING METHODS USING ADAPTIVE THRESHOLD FOR REMOVAL OF CHROMA/LUMINANCE CROSS-TALK IN QUADRATURE-MODULATED SUBCARRIER COLOR TELEVISION SYSTEMS

FIELD OF THE INVENTION

The present invention relates to method and apparatus for processing quadrature modulated color television picture signals. More particularly, the present invention relates to a method and apparatus for processing color television signals to optimize the reduction of cross-color and cross-luminance artifacts by use of an adaptive threshold.

BACKGROUND OF THE INVENTION

Figure 1:
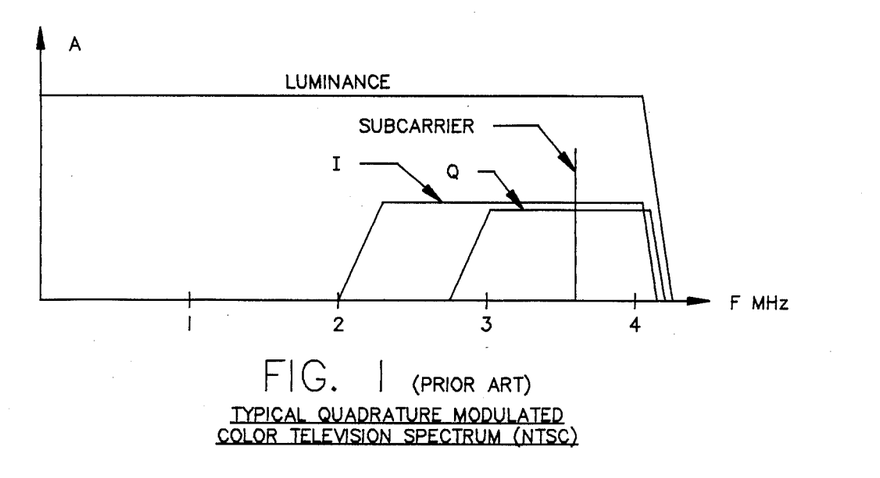
FIG. 1 is a graph of the frequency spectrum occupied by a typical quadrature modulated color television picture signal in accordance with the NTSC format.

The basic concept underlying PAL and NTSC quadrature-modulated encoding television systems is that the same spectrum is shared by chroma and luminance information (FIG. 1).

For the sake of simplicity, the following presentation is limited to the NTSC color signal format, since it is well understood in the art that the principles hereof apply with like force and result in systems following the PAL signal format.

Figure 2:
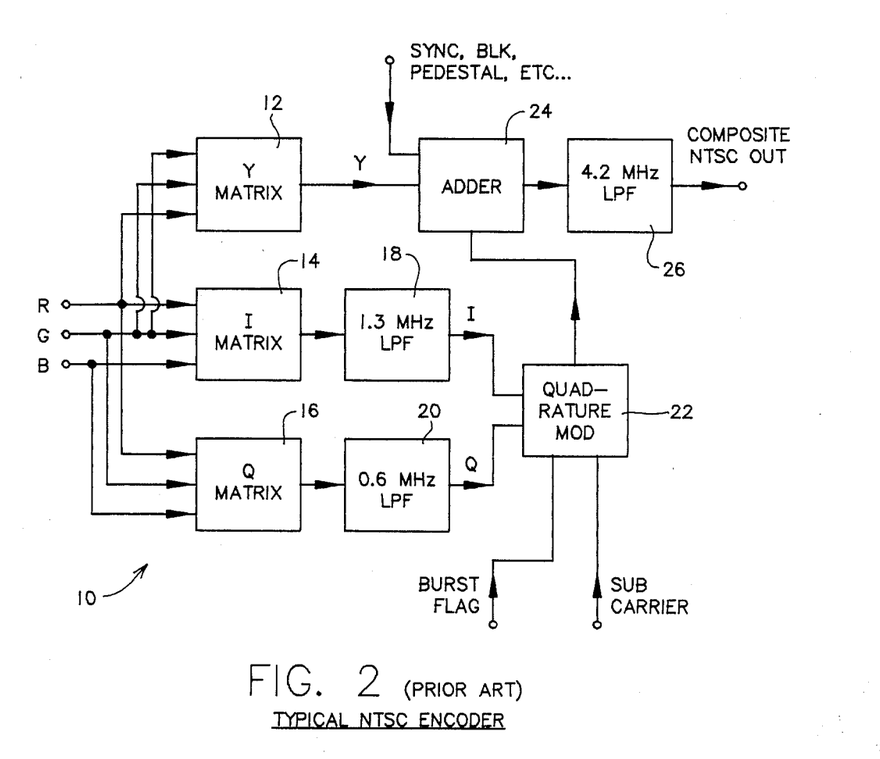
FIG. 2 is a block diagram of a conventional encoder for encoding a color television picture signal in accordance with the NTSC format.

A typical NTSC encoder is represented by the FIG. 2 block diagram. The R (red), G (green) and B (blue) signal inputs from the camera are applied to 3 matrices. The outputs of these matrices are luminance (Y) and the two chroma components (I and Q). Luminance bandwidth is typically limited to 4.2 MH$_z$, the I component bandwidth is typically limited to 1.3 MH$_z$, and the Q component bandwidth is typically limited to 0.6 MH$_z$. The I and Q components are then impressed as carrier-suppressed amplitude modulation components in phase-quadrature upon a 3.579545 MH$_z$ subcarrier. This subcarrier frequency is selected in such a way as to result in a 180° phase shift from scanning line to adjacent scanning line, and from frame to frame, within the color television picture signal.

The quadrature modulated subcarrier is then added to the luminance carrier, and the resultant composite video signal is typically low pass filtered at 4.2 MH$_z$. Addition of composite synchronization pulses, proper blanking, pedestal adjustments etc., results in a signal in accordance with the NTSC format.

Figure 3:
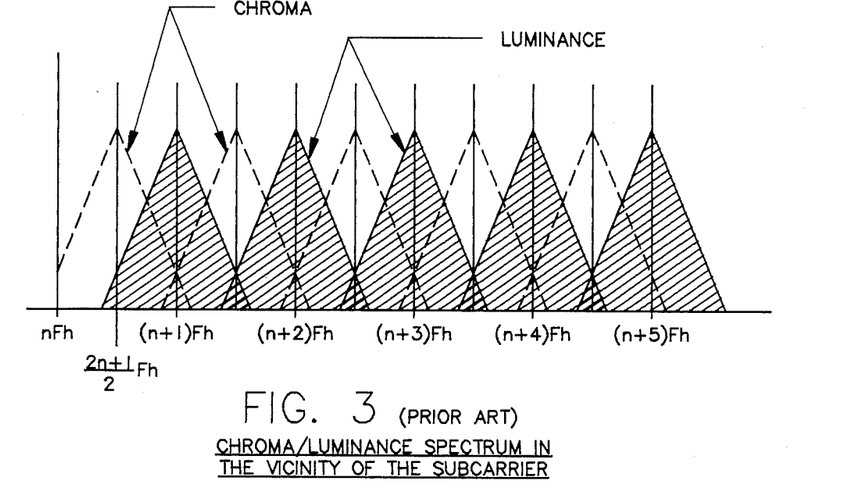
FIG. 3 is a greatly enlarged graph of a portion of frequency spectrum occupied by a typical quadrature modulated NTSC color television picture signal in the vicinity of the subcarrier frequency.

A detailed examination of the frequency spectrum of an NTSC encoded color picture signal in the vicinity of the subcarrier shows the well-known "interleaving" principle (FIG. 3). Spectral rays of a typical television scene are grouped around multiples of fh (where fh= horizontal scanning frequency) for the luminance information, while chroma components are grouped around (2n+1)/2 fh (where n is an integral number). This grouping is a particularly accurate representation of the spectral appearance of vertical components of the picture, and enables separation of chroma and luminance at the receiver to be accomplished by use of a comb filter with a fair degree of discrimination between these two components.

Unfortunately, the frequency interleaving is perfect only in the case of vertical transitions in the picture. Diagonal and horizontal transitions in the picture image manifest and undesirable overlap of chroma and luminance spectra; and, the separation of the luminance and chroma components in the receiver becomes difficult and in some cases, impossible at such transitions.

As a result of imperfect separation of luminance and chroma components, certain luminance components will be misunderstood by the receiver's decoder and decoded as color. This mistake results in the well known "cross-color" pattern which is typically perceived as a moving rainbow accompanying diagonal luminance transitions, or color activity associated with luminance details.

Certain chroma components will also be misunderstood by the decoder and decoded as luminance. One or 2 lines of dots at the 3.58 MHz color subcarrier frequency will be perceptibly present in the luminance path for horizontal chroma transitions with comb filter decoders. A decoder using a 3.58 MHz trap in the luminance path exhibits either a poor frequency response, or a vertical dot pattern with vertical chroma transitions, or both.

Figure 4:
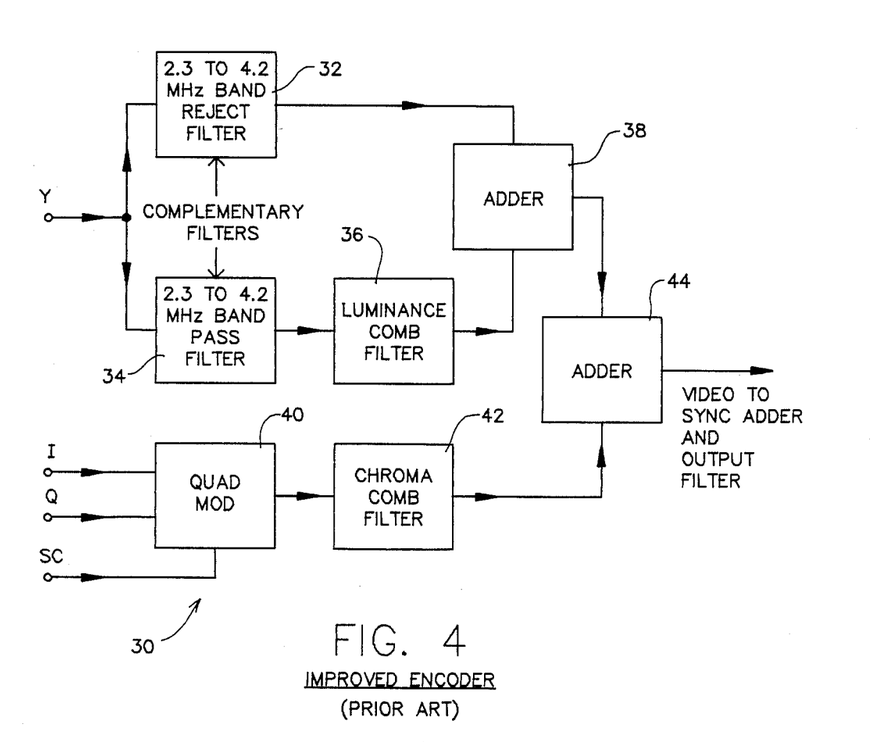
FIG. 4 is a block diagram of an improved encoder for encoding a color television picture signal in accordance with the NTSC format in a manner which reduces unwanted cross-color and cross-luminance picture artifacts resulting from spectral overlap.

Thus, it has become popular to process luminance and chrominance components by comb filter structures prior to their addition in an NTSC (or PAL) quadrature modulation encoder. As shown in FIG. 4, only the frequencies which are in the vicinity of the chroma subcarrier frequency are "Y" combed in the luminance path, while the entire chrominance spectrum is in effect "C" combed in the chroma path. The structure of FIG. 4 has been found to be effective in reducing significantly cross-color and cross-luminance artifacts customarily associated with the NTSC (or PAL) process. Spectral results achieved by such comb filter processes are graphed in FIGS. 5A–D.

In the situation where a comb filter processor is processing a luminance component in a color television signal path, what is happening is that the high frequencies are averaged over e.g. three lines. Luminance frequencies which happen to be in the chroma subcarrier area are averaged over three lines. When the information in the adjacent lines is arranged vertically, the average is the same as corresponding information in each line. When a transition is horizontal, there is nothing to average, and there is no problem. However, if a transition is angled at e.g. forty five degrees (45°), or at some certain angle other than zero or ninety degrees, the luminance transition does not line up vertically, and the averaging of the comb filter creates a blur or smearing along its length.

The situation is not as bad as it may seem, since the NTSC format provides about forty percent (40%) shorter visual transitions at forty five degrees (45°) than along either the horizontal or vertical dimension. In other words, it takes the square root of two less time for a black to white transition along the forty five degree dimension of the picture than for the same transition along a ninety degree (vertical) dimension thereof. Thus, it is possible to degrade the diagonal picture resolution somewhat by the insertion of the luminance comb filter structure without resulting degradation becoming visibly objectionable in a standard bandwidth picture and without resort to any adaptivity to control the luminance comb filter structure.

It has become popular to follow an NTSC format having a bandwidth considerably wider than the format's nominal 4.2 MHz, particularly in applications such as computer generated graphics. In such high resolution environments, including the broadcast and movie studio, and multiple generation video recording, any visible loss of resolution is noticeable and is to be avoided, if at all possible.

While it is known that the luminance comb filter structure will eliminate cross color artifacts, with resultant degradation of diagonal or a motion resolution, a hitherto unsolved need has arisen for a control mechanism which effectively removes the luminance comb filter structure from the signal processing path in those picture instances in which cross color is *not* perceptible and does not need to be eliminated by comb filter spectral processing of the luminance component. This control mechanism will then avoid resolution losses when picture conditions make comb filtering unnecessary.

While comb filter structures having threshold control in signal decoders have been proposed in several prior art references, none has achieved a practical solution to the problem as is achieved by the present invention, more particularly in the case of a luminance comb filter used in the luminance path of an encoder prior to its addition to chroma. Such prior examples include the present applicant's own U.S. Pat. No. 4,240,105 which provides for threshold control of a logic circuit controlling gating of comb filter processed luminance in a color decoder apparatus.

SUMMARY OF THE INVENTION WITH OBJECTS

A general object of the present invention is to prevent generation of cross-color and cross-luminance patterns in quadrature modulated color television picture signals without needless reduction of picture resolution in a way which overcomes limitations and drawbacks of the prior art.

A specific object of the present invention is to prevent the occurrence of cross-color and cross-luminance by allocating different spectral areas to luminance and chroma components by comb filter processes whenever such processes are required to prevent such occurrence.

A further object of the present invention is to reduce adaptively chroma/luminance spectral overlap in the color encoder, thereby enabling a more effective separation of these components in the decoder.

Another object of the present invention is to provide improved methods and apparatus for processing quadrature modulated color television picture signals with comb filter structures adaptively inserted in the luminance path effectively to reduce cross color artifacts without undue or unnecessary degradation of picture resolution.

In accordance with one aspect of the present invention, a comb filter for improved cross-color reduction with improved visible diagonal resolution is provided for processing a luminance component of a quadrature modulated color subcarrier television signal in the vicinity of the color subcarrier pass band. The comb filter comprises an input and an output, and has a first path including a delay circuit for delaying the luminance component and a subtraction circuit connected between the input and the output, and has a second path including a chrominance type comb filter, a band pass filter for passing a spectrum in the vicinity of the color subcarrier pass band both being followed by a variable threshold circuit connected to the subtraction circuit. The variable threshold circuit is for inhibiting the signal in the second path below a variable threshold. The variable threshold is derived as a function of at least one of luminance diagonal transition level, chroma level and luminance activity in the spectrum in the vicinity of the color subcarrier averaged over a given time period.

In accordance with another aspect of the present invention, a method for processing a color television picture signal including a luminance component and a color component which is amplitude modulated in phase quadrature upon a suppressed subcarrier, to reduce cross-color and cross-luminance artifacts in a resultant signal, includes the steps of:

comb filtering the quadrature modulated color component to put out a comb filtered chroma component;

processing the luminance component by passing the luminance component through two complementary filters both symmetrically centered about a color component subcarrier frequency, one filter comprising a band pass filter and the other filter comprising a band reject filter; developing a variable threshold control signal based on luminance diagonal transition level, chroma level and luminance activity in the 2.5 to 4.5 MHz area averaged over a given time period, such as one microsecond for example; filtering the luminance signal passing through the band pass filter in those instances when the threshold control signal is present; and, adding in phase the above-threshold, comb filtered luminance signal and the signal passing through the band reject filter in order to provide a comb filtered full bandwidth luminance signal; and combining in phase the comb filtered chroma component and the comb filtered full bandwidth luminance signal in order to provide the resultant signal.

The foregoing and other objects, advantages and features of the present invention will be further understood and appreciated by those skilled in the art from consideration of the following detailed description of a preferred embodiment, presented in conjunction with the accompanying drawings.

DETAILED DESCRIPTION OF PREFERRED EMBODIMENTS

The present invention is best understood against the background of conventional NTSC encoding techniques. Such techniques are generalized by the FIG. 2 block diagram which shows a conventional encoder 10, typically found in association with a color television camera at the studio, or elsewhere. Red (R), Green (G) (sometimes also used directly for the luminance channel) and Blue (B) scanned picture components enter the encoder 10 on R, G and B lines from the camera (not shown). These three components pass through a luminance (Y) matrix 12, an I color component matrix 14, and a Q color component matrix 16. The Y matrix 12 puts out the luminance component.

The I color component is passed through a low pass filter 18 having a 6 db cutoff at 1.3 MHz; and the Q color component is passed through a low pass filter 20 having a 6 db cutoff at 0.6 MHz. The filters 18, 20 thereby have the effect of band limiting the I and Q color components. These components enter a quadrature modulator 22 wherein they double sideband amplitude modulate in phase quadrature a color subcarrier which is itself suppressed in level in the modulation process. A burst flag is also added at the quadrature modulator 22.

The luminance signal from the matrix 12 is combined with the quadrature modulated color signal from the modulator 22 in an adder circuit 24 in which synchronization signals such as horizontal and vertical sync, blanking, pedestal, etc. are also added. The resultant composite color signal is low pass filtered in a filter 26 having a 6 db rolloff at 4.2 MHz in order to meet the NTSC signal format standard.

FIG. 3 illustrates the spectral overlap between the luminance and the chroma components located in the spectrum of the composite picture signal put out by the FIG. 2 encoder 10 at the vicinity of the color subcarrier. Substantial spectral overlap is apparent in the FIG. 3 graph.

Significant reduction of spectral overlap is achieved with the encoder depicted in FIG. 4. Therein, an encoder 30 includes a luminance signal path and a color component signal path. The Y, I and Q components already have been encoded by appropriate matrix operation which may be the same as performed in the FIG. 2 encoder 10.

The luminance (Y) enters two complementary (inversely symmetrical) filters, a band reject filter 32 and a band pass filter 34. In this NTSC example, the filters 32 and 34 have band reject/pass between 2.3 and 4.2 MHz respectively.

Only the frequencies which are in the bandpass of the quadrature modulated chrominance subcarrier are then subjected to comb filtering in a luminance comb filter 36 (while the entire chrominance spectrum is chroma combed, as will be described shortly. The purpose of this selective frequency comb filtering is to reduce significantly cross-color and cross-luminance artifacts customarily associated with the NTSC or PAL color format processes. As already noted, while cross-color is significantly reduced there are still instances of visible reduction of diagonal resolution. When the luminance high frequencies are not perfectly aligned on a line-to-line basis, and when they are averaged over 3 or more scanning lines, the resultant information level is necessarily reduced, and as a result, diagonal transitions will exhibit a lower frequency response than they would if they were not submitted to high frequency luminance comb filter processing. The resultant picture will look "softer" with the comb filter process operating.

Returning to a consideration of FIGS. 4 and 5, the luminance comb filter 36 provides reduction of spectral overlap as a function of line delay: the greater the integral number of line delays carried out by the filter, the greater the reduction of resultant spectral overlap.

The components of luminance which have been subcarrier region band rejected by the filter 32 and comb filtered in the subcarrier region are combined in a first adder circuit 38 to provide a processed luminance component which has been effectively comb filtered in the subcarrier region.

The I and Q chroma components are quadrature modulated in a quadrature modulator 40 which operates in the same manner as the quadrature modulator 22 of the conventional encoder 10. Then, the color subcarrier put out by the modulator 40 is subjected to comb filtering by a comb filter 42, which is in concept the same as the comb filter 36 which is used to process the luminance component in the vicinity of the subcarrier frequency. The comb filtered color subcarrier is then combined with the luminance from the first adder 38 in a second adder 44 to provide a color video signal characterized by reduction in spectral overlap.

The essential differences between the encoders of FIG. 2 and FIG. 4 are the chroma and luminance comb filters 42 and 36 utilized in the FIG. 4 encoder 30, in order to eliminate luminance spectral components susceptible to be added to chroma areas, and chroma spectral components susceptible to be added to luminance components in spectral areas reserved to luminance.

The drawbacks of the FIG. 4 encoder 30 approach are the following:

First, luminance diagonal transitions resolution degradation. As the luminance comb filter 36 averages over few lines, the luminance information over 2.3 MHz, response degradation may be observed on transitional response at 45°. It is, however to be noted that such a degradation will be non-existent with trap decoders (no high frequencies are present in the luminance path in such a case) and very low with comb filter decoders, which are degrading it anyway, even with conventional encoding.

Second, chroma vertical resolution. Chroma transitions will be blurred over two or more lines. However, such a blurring merely matches the I horizontal resolution, and if a passive 2 H comb filter decoder is being used, the increase in blurring will be negligible.

Figure 5A:
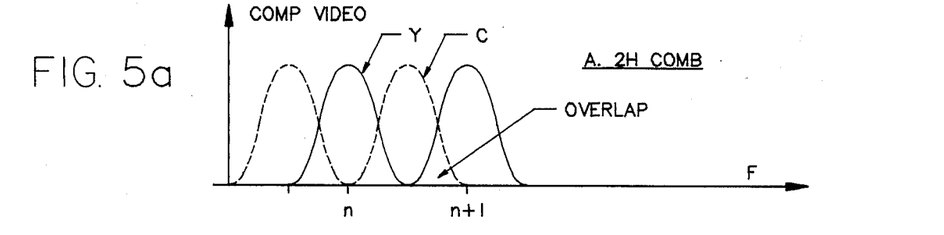
FIGS. 5A, 5B, 5C, and 5D graph the frequency responses of four different comb filters in an encoder in order to show that as the number of picture line delays provided for comb filtering increases, the amount of spectral overlap between luminance and chroma components decreases for 5A, 5B and 5C, and is virtually eliminated if frame memories are also used (FIG. 5D).

Depending upon the complexity of the comb filters being used for the filters 36 and 42, the spectral overlap will be high or low. A simple 2 H comb filter results in a fair amount of overlap as illustrated in FIG. 5A.

As a result, there will be a certain amount of cross-color and cross-luminance left in the final picture. It will never be as objectionable as it was with a conventional encoder (FIG. 2) but may be visible in certain cases.

Figure 5B:
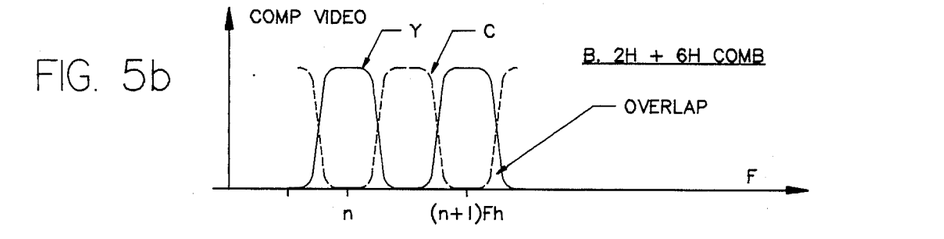
Figure 5C:
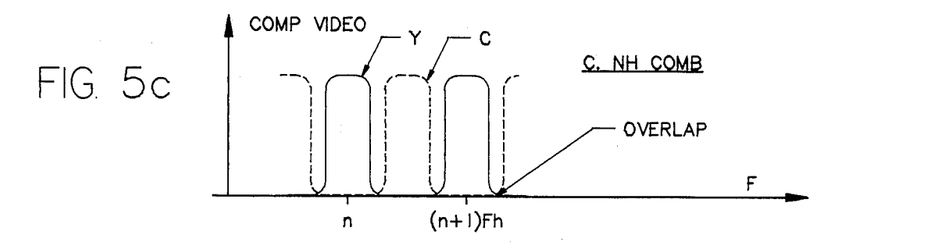

In order to avoid this drawback comb filters can be built with "square teeth", as shown in FIG. 5B, or even better, "unsymetrical rectangular teeth" as shown in FIG. 5C; and the spectral overlap will be reduced (FIG. 5B) or eliminated (FIG. 5C). Responses such as those represented on FIG. 5C eliminate all overlap, but require more delay (up to 13 H). It is to be noted, however, that multiple line delays are easily obtained if comb filtering operations are carried out in the digital domain.

Further details of improved comb filter structures in both encode and decode processes within quadrature modulated color television systems are set forth in co-pending U.S. patent application Ser. No. 06/785,880, filed on Oct. 9, 1985, the disclosure of which is hereby incorporated herein by reference.

The use of bi-dimensional comb filters in an encoder and in a decoder at the other end of the signal path results in a picture substantially free of cross-color and cross-luminance artifacts, while some resolution is still lost as a result of motion and diagonal transitions. Bi-dimensional comb filters are further explained and illustrated in co-pending U.S. patent application Ser. No. 06/785,881, filed on Oct. 9, 1985, the disclosure of which is hereby incorporated herein by reference.

Figure 5D:
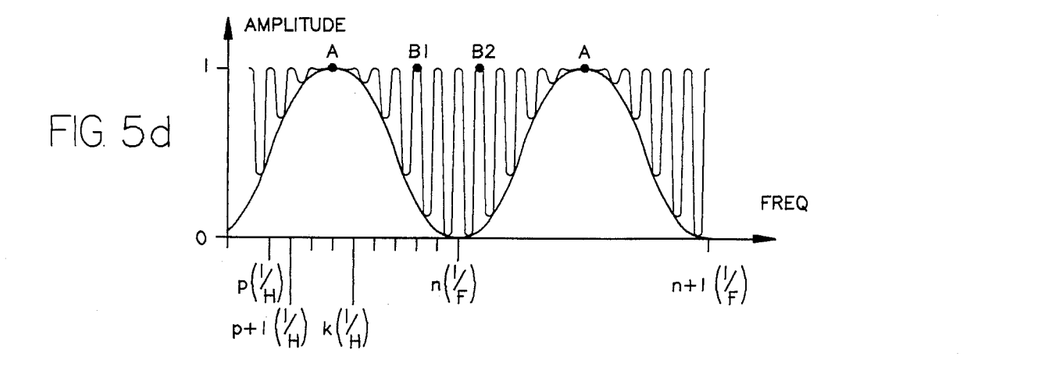

The performance of a bidimensional comb filter using two frame and two line delays is better visualized by referring to the FIG. 5D graph which represents the frequency response of the filter. Point A corresponds to the location of stationary objects and the input signal appears unfiltered at the output. Points B1 and B2 corresponds to the location of moving objects, whose spectrum falls in the area where a 2H type comb filtering takes place.

Resolution losses incident to cross-color elimination by comb filter structures in the luminance path may be further reduced and minimized to the point where they are no longer visible. Such reductions in resolution losses are achieved by incorporating a variable threshold control into a luminance comb filter processor in accordance with the principles of the present invention.

Figure 10:
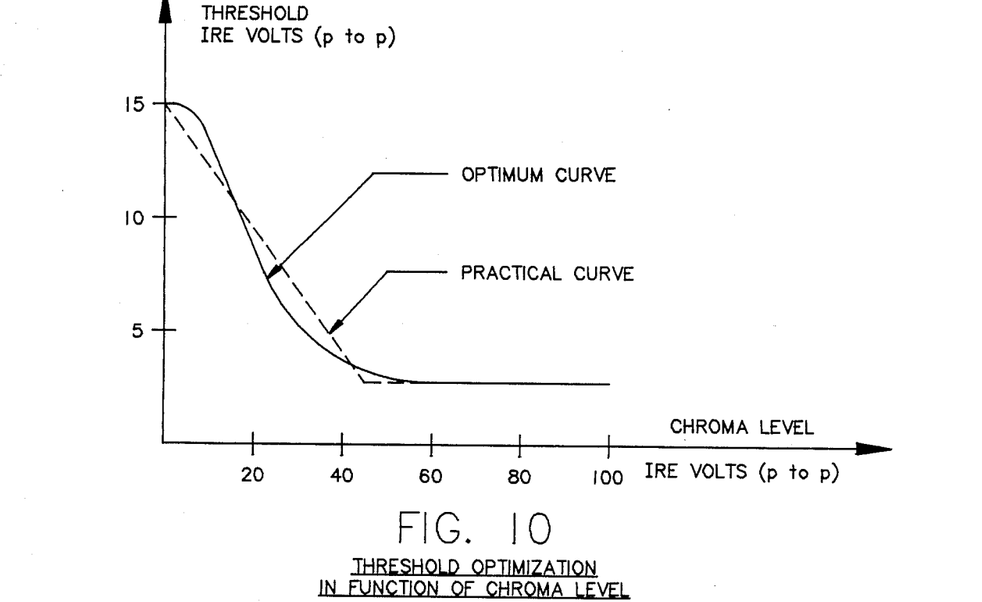
FIG. 10 is a graph of threshold optimization in function of chroma amplitude level.

It has been discovered that the variable threshold signal should be derived in order to inhibit combing at low luminance diagonal transition levels, and enable combing to occur at high luminance diagonal transition levels. If the threshold signal further varies in function of the chroma level, so as to have a high value at low chroma levels and a low value at high chroma levels, luminance combing will occur more likely at high chroma levels, when cross-color conditions are more likely to be visible, as graphed in FIG. 10. Finally, if the threshold signal also varies in function of the 2-4 MHz luminance activity averaged over a predetermined time period, a further refinement and improvement in luminance comb filter control is achieved.

Before considering the implementation of a variable threshold control for a luminance comb filter, it should be noted that luminance comb filter processing, in the vicinity of the color subcarrier bandwidth where cross-color arises, may be realized in comb filter structures which are slightly different than the structure depicted in FIG. 4.

Figure 6:
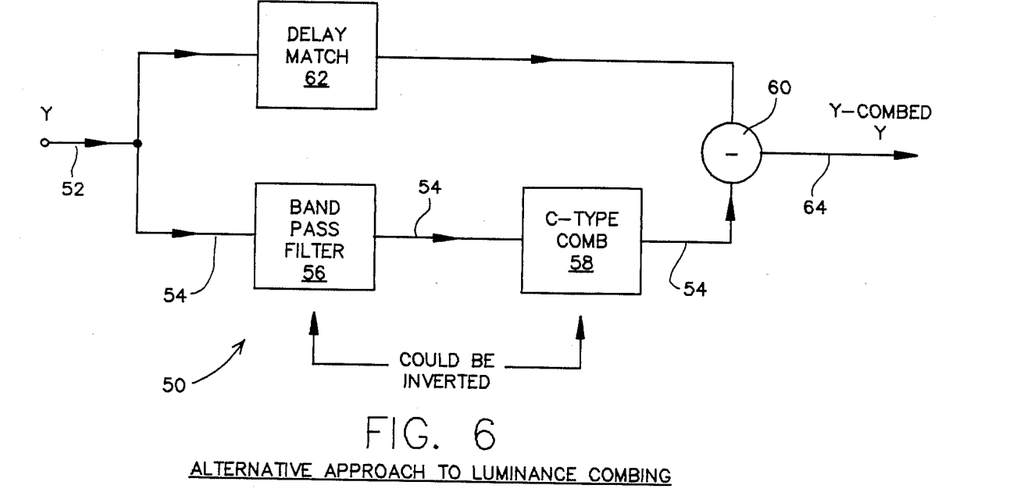
FIG. 6 illustrates an alternative structural approach to the luminance comb filter processor depicted in FIG. 4.

In FIG. 6, a luminance comb filter 50 includes an input 52 for receiving incoming luminance. The luminance is passed through a path 54 which includes in series a band pass filter 56 for passing high frequency luminance in the vicinity of the color subcarrier bandpass and a chrominance comb filter 58. A difference circuit 60 subtracts the combed signal exiting the path 54 from incoming luminance, as taken from the input 52 through an appropriate delay matching circuit 62 maintain proper phase relationship. The resultant difference signal at an output 64 is combed luminance.

Figure 7:
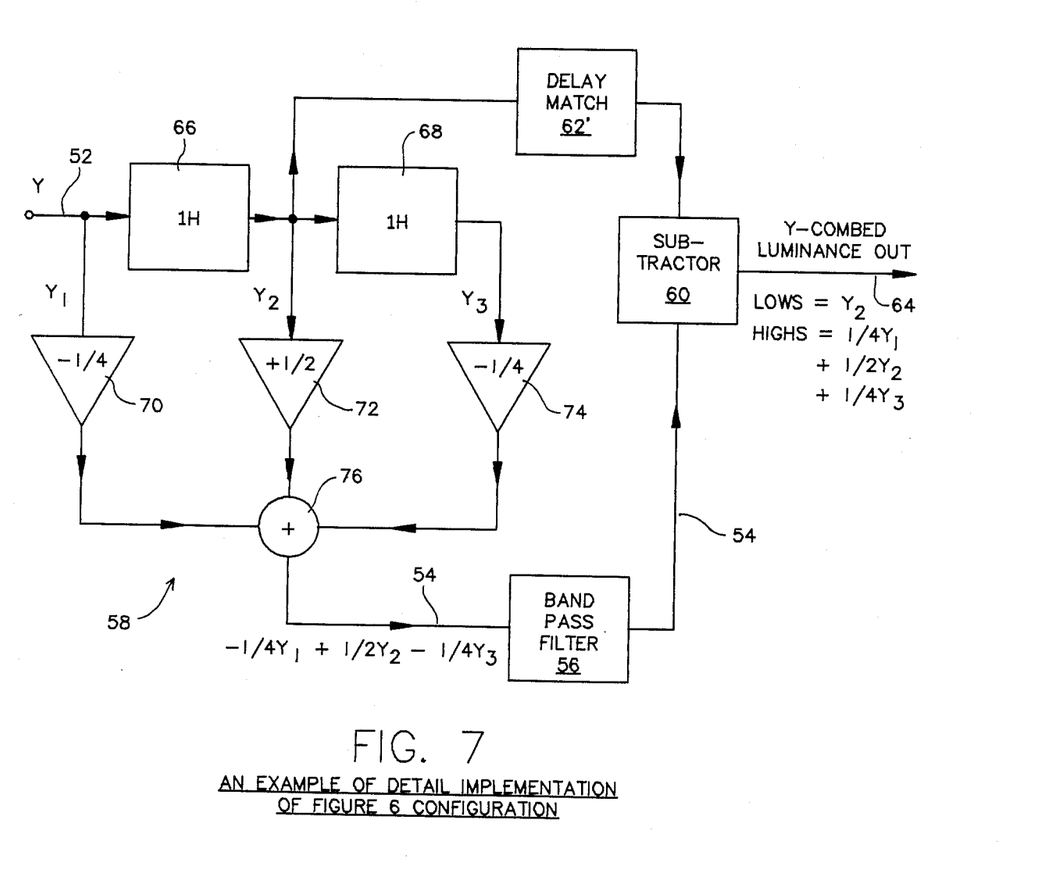
FIG. 7 is a more detailed block diagram of a practical implementation of the alternative structure depicted in FIG. 6.

The comb filter 50 is shown in greater structural detail in FIG. 7. Therein, the 2H chrominance comb filter 58 includes two one-line delay lines 66 and 68, connected as shown. Three amplifiers 70, 72 and 74 amplify coefficients of undelayed luminance $(-\frac{1}{4}Y1,$ amplifier 70), one-line-delayed luminance $(+\frac{1}{2}Y2,$ amplifier 72), and two-line-delayed luminance $(-\frac{1}{4}Y3,$ amplifier 74). Outputs from these amplifiers 70, 72 and 74 are combined in proper phase relationship in a combiner circuit 76 which feeds the resultant combed signal out over the path 52 where it passes through the band pass filter 56.

Figure 8:
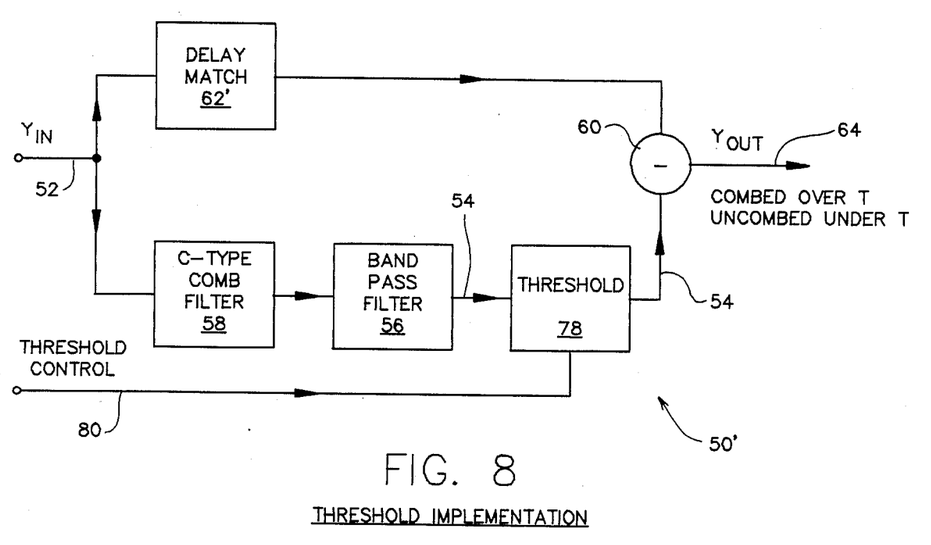
FIG. 8 is a block diagram which illustrates a luminance comb filter structure including a threshold control in accordance with the principles of the present invention.

FIG. 8 illustrates one practical implementation of a variable threshold circuit 78 in accordance with the present invention for controlling operation of a luminance comb filter structure 50'. Therein, the circuit 50' is identical to the FIG. 6 luminance comb filter, except that the threshold circuit 78 has been interposed in the path 54 in series with the chrominance-type comb filter 58 and the band pass filter 56. A delay match circuit 62' provides proper signal delay to main path luminance, given the presence of the threshold circuit 78 and any additional delays its presence may introduce to the combed signal on the path 54.

Figure 9:
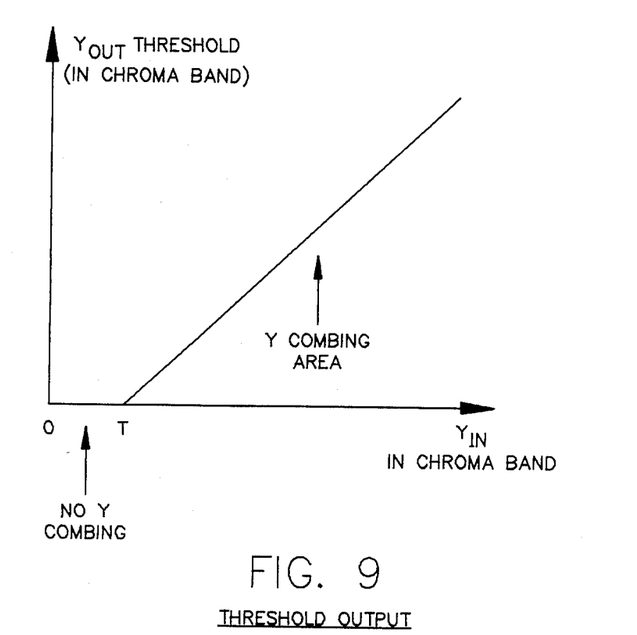
FIG. 9 is a graph of the effect of the threshold control signal upon the operation of the circuit depicted in FIG. 8.

As is graphed in FIG. 9, below the variable threshold value no luminance combing is carried out in the vicinity of the color subcarrier bandpass. Above the threshold value, luminance combing is carried out. The threshold circuit 78 is controlled by a threshold signal present on a line 80. The function of this threshold signal is to switch off the luminance comb filter 50' during low cross-color picture conditions, and to switch it on whenever high cross-color conditions are otherwise expected to occur.

By making the threshold control signal on the line 80 a function of (1) luminance transition levels, (2) chroma levels, and (3) average high frequency luminance activity after chroma-style combing, the inventive comb filter 50' eliminates cross-color artifacts only when they otherwise would be visible in the picture, and still eliminates any visible loss of diagonal resolution.

Figure 11:
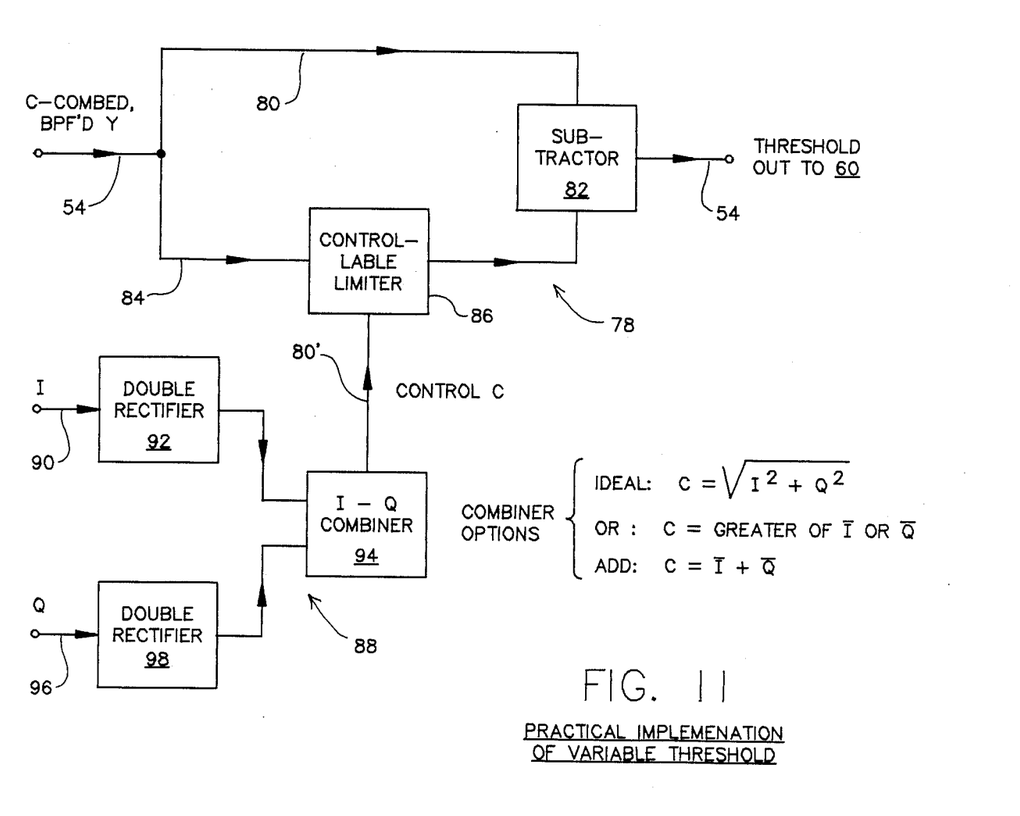
FIG. 11 is a block diagram of a circuit for generating a variable threshold control signal in accordance with principles of the present invention.

FIG. 11 illustrates one practical implementation of the threshold circuit 78 and additional circuitry for providing a variable threshold control signal in accordance with chroma level. Chroma-combed, bandpass filtered luminance on the path 54 of the circuit 50' after the comb filter 58 and band pass filter 56 enters the circuit 78 and immediately is divided between two paths: a path 80 leading directly to a subtractor 82, and a path 84 leading to a controllable limiter circuit 86. A chrominance variable threshold control signal, Control C, enters the limiter 86 via the line 80'.

A variable chrominance threshold control signal derivation circuit 88 includes an I color component input 90 and a Q color component input 96. The I input 92 leads to a double rectifier 92 which derives an absolute value for I irrespective of transition direction, and the Q input 96 leads to a double rectifier which likewise derives an absolute value for Q (U and V matrix components in the PAL format would be used in lieu of the NTSC I and Q components). These absolute values for I and Q are combined in an I-Q combiner circuit 94.

The circuit 94 ideally derives Control C as the square root of the sum of I squared and Q squared. Alternatively it derives Control C as the greater of the absolute values of I or Q, or the sum thereof.

Figure 12:
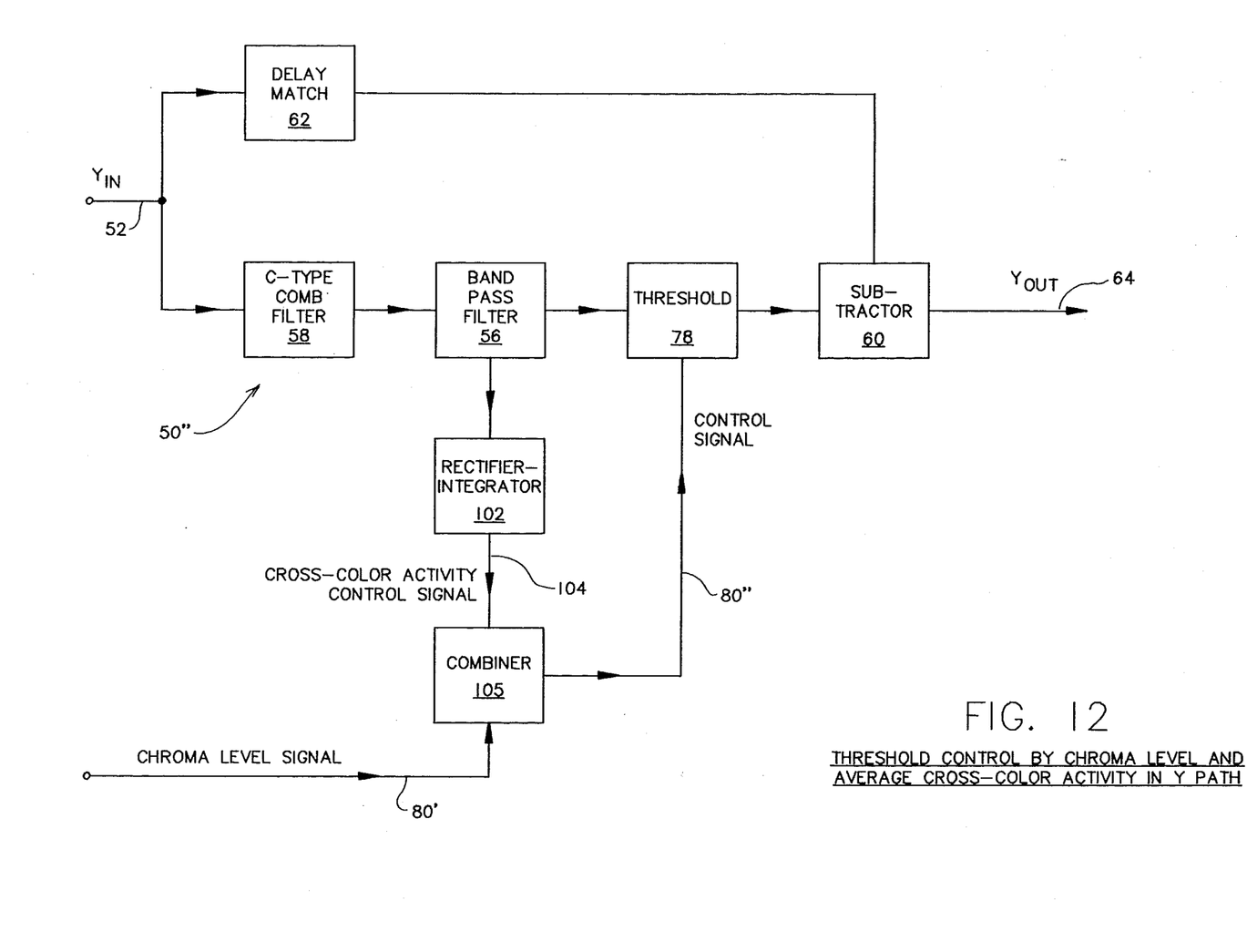
FIG. 12 is a block diagram of an alternative preferred embodiment of the present invention which provides threshold control of a luminance comb filter process by chroma level and average cross-color activity measured over a predetermined time period.

FIG. 12 illustrates threshold control of a luminance comb filter by a variable threshold control signal which is a function of chroma level and the average combed luminance activity which could generate cross-color. Therein, the circuit 50" includes in addition to the elements depicted in FIG. 8 a rectifier-integrator circuit 102 which derives from the band pass filtered combed luminance a cross-color activity control signal which it puts out on a line 104. The chroma level activity derived, e.g. by the circuit 88 of FIG. 11, enters a combiner circuit 105, as does the rectified-integrated cross-color signal on the line 104. The resultant control signal is supplied to the threshold circuit 78 over a line 80".

While the method and apparatus of the present invention have been summarized and explained by an illustrative application in reduction of cross-color and cross-luminance patterns by use of variable threshold controlled comb filtering processes for quadrature modulated color television signals, it will be readily apparent to those skilled in the art that many widely varying embodiments and applications are within the teaching and scope of the present invention, and that the examples presented herein are by way of illustration only and should not be construed as limiting the scope of this invention.

We claim:

1. A comb filter for processing a luminance component of a quadrature modulated color subcarrier television signal in the vicinity of the color subcarrier pass band, the comb filter comprising an input and an output, and having a first path including a delay circuit for delaying the luminance component and a subtraction circuit connected between the input and the output, and a second path including a chrominance type comb filter, a band pass filter for passing a spectrum in the vicinity of the color subcarrier pass band followed by variable threshold circuit means connected to the subtraction circuit, the variable threshold circuit means for inhibiting the signal in the second path below a variable threshold being derived as a function of at least one of luminance diagonal transition level, chroma level and luminance activity in the spectrum in the vicinity of the color subcarrier.

2. The comb filter set forth in claim 1 contained within a color encoder within a quadrature modulated color subcarrier television system.

3. A method for controlling the operation of a luminance comb filter in a color television system including the steps of: chrominance-type comb filter processing of at least that portion of a luminance component of a quadrature modulated color subcarrier television signal filter interleaved in the spectrum of the color subcarrier pass band and band pass filtering the luminance component to limit it to the spectrum of said color subcarrier pass band to provide a band pass filtered and combed luminance component, subjecting the band pass filtered and combed luminance component to a variable threshold below which said band pass filtered and combed luminance component is inhibited and above which said band pass filtered and combed luminance component is passed, subtracting said band pass filtered and combed luminance component as passed by said variable threshold from a delay matched original luminance component to provide a combed original luminance component whenever said band pass filtered and combed luminance component is passed and a non-combed original luminance component whenever said band pass filtered and combed luminance component is not passed.

4. The method set forth in claim 3 comprising the further step of deriving said variable threshold as a function of at least one of luminance diagonal transition level, chroma level and luminance activity in the spectrum in the vicinity of the color subcarrier.

5. The method set forth in claim 4 wherein the step of deriving said variable threshold level is carried out by deriving chroma level as one of the square root of the sum the squares of two color matrix signals, the greater of the absolute values of said two color matrix signals, and the sum of the absolute values of said two color matrix signals.

6. The method set forth in claim 5 applied to an NTSC format color television signal wherein the two color matrix signals are I and Q.

7. The method set forth in claim 5 applied to a PAL format color television signal wherein the two color matrix signals are U and V.

8. The method set forth in claim 3 carried out within an encoding process in a quadrature modulated color subcarrier television system.

* * * * *